United States Patent
Tighe et al.

(10) Patent No.: US 7,590,231 B2
(45) Date of Patent: Sep. 15, 2009

(54) SUPPORTING ENHANCED MEDIA COMMUNICATIONS IN COMMUNICATIONS CONFERENCES

(75) Inventors: James R. Tighe, Frisco, TX (US); Paul S. Hahn, Prosper, TX (US); Richard B. Platt, Prosper, TX (US); Rowan L. McFarland, Carrollton, TX (US)

(73) Assignee: Cisco Technology, Inc., San Jose, CA (US)

( * ) Notice: Subject to any disclaimer, the term of this patent is extended or adjusted under 35 U.S.C. 154(b) by 1050 days.

(21) Appl. No.: 10/810,516

(22) Filed: Mar. 26, 2004

(65) Prior Publication Data

US 2005/0041604 A1 Feb. 24, 2005

Related U.S. Application Data

(60) Provisional application No. 60/496,032, filed on Aug. 18, 2003.

(51) Int. Cl.
*H04M 3/42* (2006.01)

(52) U.S. Cl. .......... 379/202.01; 370/260; 370/261; 370/352; 370/473; 386/96; 709/204; 709/227

(58) Field of Classification Search .......... 379/202.01; 370/261, 260, 352, 473; 709/227, 204; 386/96
See application file for complete search history.

(56) References Cited

U.S. PATENT DOCUMENTS

| | | | | |
|---|---|---|---|---|
| 5,341,374 A | | 8/1994 | Lewen et al. | 370/85.4 |
| 5,481,543 A | * | 1/1996 | Veltman | 370/473 |
| 5,497,373 A | | 3/1996 | Hulen et al. | 370/79 |
| 5,995,516 A | | 11/1999 | Iwasaki et al. | 370/466 |
| 6,154,463 A | | 11/2000 | Aggarwal et al. | 370/408 |
| 6,154,466 A | | 11/2000 | Iwasaki et al. | 370/466 |
| 6,161,137 A | | 12/2000 | Ogdon et al. | 709/224 |
| 6,163,647 A | * | 12/2000 | Terashima et al. | 386/96 |
| 6,262,979 B1 | | 7/2001 | Anderson et al. | 370/267 |
| 6,526,445 B1 | * | 2/2003 | Kumar et al. | 709/227 |
| 6,538,996 B1 | | 3/2003 | West et al. | 370/238 |
| 6,631,416 B2 | | 10/2003 | Bendinelli et al. | 709/227 |
| 6,677,976 B2 | | 1/2004 | Parker et al. | 348/14.08 |
| 6,690,654 B2 | | 2/2004 | Elliott et al. | 370/260 |
| 6,692,359 B1 | | 2/2004 | Williams et al. | 463/42 |
| 6,711,623 B1 | | 3/2004 | Furukawa et al. | 709/249 |
| 6,731,609 B1 | | 5/2004 | Hirni et al. | 370/260 |
| 6,741,586 B1 | | 5/2004 | Schuster et al. | 370/352 |
| 6,760,749 B1 | | 7/2004 | Dunlap et al. | 709/204 |
| 6,847,618 B2 | * | 1/2005 | Laursen et al. | 370/261 |

(Continued)

OTHER PUBLICATIONS

PCT International Search Report regarding Application No./Patent No. PCT/US04/25686 (11 pages), Mar. 14, 2006.

(Continued)

*Primary Examiner*—Gerald Gauthier
(74) *Attorney, Agent, or Firm*—Baker Botts L.L.P.

(57) ABSTRACT

A method for supporting communications involves establishing a communications conference that includes multiple conference participants that each provide an audio stream. Audio data packets in the audio streams are identified, and audio information from selected audio data packets is mixed to generate a conference audio stream that is communicated to the conference participants. Enhanced media packets in at least one of the audio streams are identified, and the enhanced media packets are communicated to selected conference participants.

28 Claims, 5 Drawing Sheets

U.S. PATENT DOCUMENTS

| | | | |
|---|---|---|---|
| 7,236,580 B1 * | 6/2007 | Sarkar et al. | 379/202.01 |
| 7,302,050 B1 * | 11/2007 | Michalewicz | 379/202.01 |
| 7,330,541 B1 * | 2/2008 | Surazski et al. | 379/202.01 |
| 2004/0047342 A1 * | 3/2004 | Gavish et al. | 370/352 |
| 2004/0223464 A1 * | 11/2004 | Dye et al. | 370/260 |

OTHER PUBLICATIONS

Tighe, et al., *Supporting enhanced media communications*, U.S. Appl. No. 10/810,512, filed Mar. 26, 2004.

English language text from First Office Action from State Intellectual Property Office of the People's Republic of China, Application No. 200480020781.5, 2 pages.

English language text from the Second Office Action from the Patent Office of the People's Republic of China, Application No. 200480020781.5, 6 pages, dated Jan. 23, 2009.

USPTO, Office Action U.S. Appl. No. 10/810,512, Oct. 8, 2008.

USPTO, Office Action U.S. Appl. No. 10/810,512, Apr. 29, 2009.

* cited by examiner

SUPPORTING ENHANCED MEDIA COMMUNICATIONS IN COMMUNICATIONS CONFERENCES

RELATED APPLICATION

This application claims priority to U.S. Provisional Patent Application Ser. No. 60/496,032 filed Aug. 18, 2003, entitled Video and Voice Communications, which is hereby incorporated by reference.

TECHNICAL FIELD OF THE INVENTION

The present invention relates generally to media communications, and, more particularly, to supporting enhanced media communications.

BACKGROUND OF THE INVENTION

Technological advances have created various ways to communicate data between points. One method of communicating data between points involves the use of Internet Protocol (IP) technology. However, developing appropriate applications and uses of these technological advances continues to present significant obstacles.

SUMMARY OF THE INVENTION

In accordance with the present invention, techniques for supporting enhanced media communications are provided. According to particular embodiments these techniques enable the sharing of media capabilities among devices. In particular, these techniques can enable a computing device to receive enhanced media packets through an audio link established with a remote device. For example, video packets may be transmitted or received by a computing device through an audio link established by an associated telephony device. As another example, these techniques can enable enhanced media packets to be communicated from one computing device to another through an enhanced media link.

According to a particular embodiment, a method for supporting communications involves establishing a communications conference that includes multiple conference participants that each provide an audio stream. Audio data packets in the audio streams are identified, and audio information from selected audio data packets is mixed to generate a conference audio stream that is communicated to the conference participants. Enhanced media packets in at least one of the audio streams are identified, and the enhanced media packets are communicated to selected conference participants.

Embodiments of the invention provide various technical advantages. These techniques may increase the usefulness of communications with remote devices. For example, audio and enhanced media packets, such as signaling and video packets, may be communicated with a remote device. Communication of enhanced media packets through an audio link or an enhanced media link may reduce complexities associated with communicating the enhanced media packets. For example, communication of enhanced media packets may automatically occur when two devices share an enhanced media capability. Costs associated with developing and manufacturing a stand-alone application may be reduced by distributing functionality, for example, between a packet-based telephony device and a computing device. According to particular embodiments, appropriate media communication links may be serviced by a call manager. Furthermore, a bridge may support enhanced media communication between and/or among multiple conference participants. These techniques may increase the ease-of-use associated with point-to-point communications as well as with conference communications. Additionally, these techniques may facilitate additions or changes to signal protocols used by telephony applications that will not be dependent or require changes in traditional signaling mechanisms.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
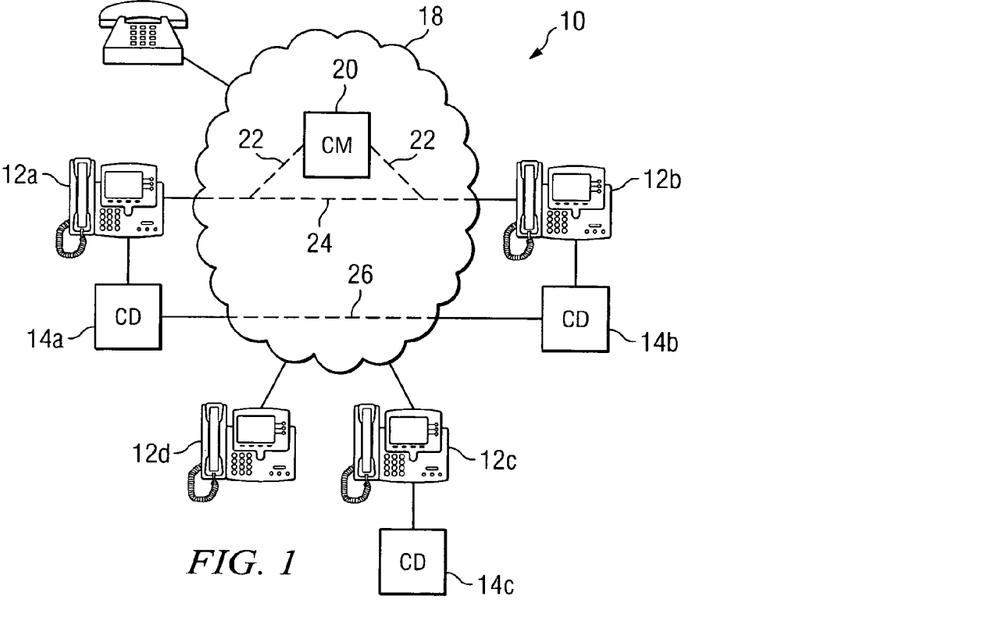
FIG. 1 illustrates a communication system having packet-based telephony devices, computing devices, and a call manager operating in accordance with principles of the present invention.

FIG. 1 illustrates a communication system, indicated generally at 10, that includes multiple packet-based telephony devices 12 each linked to a network 18. In the embodiment illustrated, system 10 also includes multiple computing devices 14, a traditional telephone 16, and a call manager 20. Within network 18, elements may interconnect using various links, such as signaling link 22, audio link 24, and enhanced media link 26. In general, audio packets and enhanced media packets may be communicated among and between telephony devices 12, computing devices 14, and traditional telephone 16 through network 18. More particularly, when one telephony device 12 establishes an audio link 24 with another telephony device 12, associated computing devices 14 may communicate enhanced media packets to each other through audio link 24 and/or enhanced media link 26.

Packet-based telephony devices 12 each represent communications equipment, including hardware and any appropriate controlling logic, for providing telephony services over a packet-based network, such as a network using Internet Protocol (IP). For example, telephony devices 12 may include Voice over Internet Protocol (VoIP) telephones. However, telephony devices 12 may include any appropriate communication devices using any suitable protocols. In the embodiment illustrated, each telephony device 12 links to network 18. However, while not explicitly shown, system 10 contemplates each telephony device 12 coupling to network 18 using any appropriate intermediary elements and networks.

Computing devices 14 each represent any suitable combination and arrangement of hardware, including any appropriate controlling logic, for computing data. For example, computing devices 12 may include desktop computers, laptop computers, personal digital assistants (PDAs), dedicated video equipment, or any other appropriate computing devices. Computing devices 14 couple to associated telephony devices 12. Computing devices 14 may directly couple to local telephony devices 12. For example, in the embodiment illustrated computing device 14c directly couples to associated telephony device 12c. Direct coupling may provide security features. For example, computing devices 14 or telephony devices 12 may be configured to only establish connections with locally cabled devices or devices having specific local network addresses. Additionally or alternatively, computing devices 14 may couple to telephony devices 12 through network 18. For example, in the embodiment illustrated computing device 14a couples directly to network 18. However, while not explicitly shown, system 10 contemplates one or more computing devices 14 coupling to network 18 using any appropriate intermediary elements and networks. Furthermore, computing devices 14 may couple to other elements of system 10 through network 18. For example, in the embodiment illustrated computing device 14a couples to computing device 14b using enhanced media link 26.

Traditional telephones 16 represent non-packet-based telephony devices that may participate in some communication sessions. For example, traditional telephone 16 may include traditional plain old telephone service (POTS) telephones, mobile phones, or any other appropriate communication device. While not explicitly shown, system 10 contemplates an appropriate intermediary network and/or gateways for coupling traditional telephones 16 to network 18.

Network 18 represents any suitable collection of hardware, software, and controlling logic to interconnect elements coupled to network 18. Thus, network 18 provides an infrastructure to support communications within system 10. In a particular embodiment, network 18 may include one or multiple networks, such as packet-based networks, circuit-switched networks, and/or any other appropriate networks.

Call manager 20 represents equipment, including hardware and any appropriate controlling logic, for assisting in the establishment of communication links between elements of system 10. For example, call manager 20 may facilitate the establishment of an audio link 24 between telephony devices 12. Call manager 20 may also facilitate the establishment of an enhanced media link 26 between computing devices 14. While illustrated as a separate component of system 10, it should be apparent that the illustrated diagram is not necessarily literal, and the functions of call manager 20 may be incorporated within or distributed among any suitable element or elements. Thus, for example, the functions of call manager 20 may be provided within selected and/or each telephony device 12.

Signaling link 22 represents a communication path between call manager 20 and telephony device 12 that may be temporary or permanent. Signaling link 22 may carry any information useful for the establishment of an audio link 24 or an enhanced media link 26. For example, signaling link 22 may carry information related to bandwidths, media capabilities, network addresses, and/or other information useful for establishing communication links.

Audio link 24 represents a communication path between two telephony devices 12 established for the exchange of audio communications. Audio link 24 may carry audio packets as well as any other data packet conforming to a protocol used by audio link 24. Thus, in particular embodiments, enhanced media packets may be communicated through audio link 24, so long as the enhanced media packets conform to the appropriate protocol used by audio link 24. Audio link 24 may utilize any of various transport and signaling protocols, including Transport Control Protocol (TCP), User Datagram Protocol (UDP), Real-time Transport Protocol (RTP), Real-time Transport Control Protocol (RTCP), Signaling Connection Control Point protocol (SCCP), or any other packet-based or IP protocol appropriate for audio communications over networks. Audio link 24 may pass through one or more firewalls within network 18.

Enhanced media link 26 represents a communication path between two computing devices 14. Enhanced media link 26 may carry audio packets as well as any other data packet conforming to a protocol used by enhanced media link 26. Thus, in particular embodiments, enhanced media packets may be communicated through enhanced media link 26, so long as the enhanced media packets conform to the appropriate protocol used by enhanced media link 26. Enhanced media link 26 may utilize any suitable transport and signaling protocols, such as those mentioned above. Enhanced media link 26 may pass through one or more firewalls within network 18.

Signaling link 22, audio link 24, and enhanced media link 26, while named as "links" for convenience of discussion, represent any appropriate pathway for communication of packets through network 18. Moreover, communication links may or may not be connection based. For example, two packets associated with one communication session may take separate paths through network 18.

In operation, telephony device 12 may associate with computing device 14 to support enhanced media communications. For example, in the embodiment illustrated telephony device 12a may associate with computing device 14a. Various methods of associating devices may be used. For example, a virtual connection may only be opened between telephony device 12 and computing device 14 when the devices are locally cabled to one another. One method of associating telephony device 12 and computing device 14 is discussed in more detail with regard to FIG. 5.

After telephony device 12 associates with computing device 14 or at any other appropriate time, computing device 14 may communicate enhanced media capabilities associated with computing device 14 to telephony device 12. For example, computing device 14 may notify telephony device 12 that computing device 14 includes an ability to transmit, receive, and display video packets. Thereafter, telephony device 12 may communicate the enhanced media capabilities to call manager 20 or any other remote device. For example, telephony device 12 may represent the enhanced media capabilities as being associated with telephony device 12 in communications with other devices. Alternatively or in addition, telephony device 12 may represent the enhanced media capabilities as being associated with computing device 14.

Media capabilities include any information related to abilities of a device to transmit, receive, analyze, present, or otherwise manipulate information. Examples of media capabilities include software applications and hardware features. Thus, media capabilities may include the ability to transmit, receive, and process audio, video, and other data packets. Furthermore, media capabilities may include the ability to execute word processing, spreadsheet, instant messaging, chalkboard, slide show, and any other software applications. Enhanced media capabilities include media capabilities other than the simple ability to communicate audio information.

At any point telephony device 12 may establish audio link 24 with at least one other telephony device 12. Audio link 24 may be established when a user of one telephony device 12 places a call to or otherwise identifies telephony device 12. For example, establishment of audio link 24 may include a user selecting a 10-digit telephone number, network address, or other appropriate identifier of a remote device. The establishment of audio link 24 may or may not include use of call manager 20. When call manager 20 is utilized to establish audio link 24, signaling link 22 may be established to couple telephony device 12 to call manager 20 through network 18. Call manager 20 may select a bandwidth or otherwise direct telephony devices 12 to establish audio link 24. Thus, for example, call manager 20 may help establish audio link 24 between telephony devices 12a and 12b.

For convenience in this discussion, remote device refers to any element linked to a device and operable to communicate information, and includes another telephony device 12, another telephony device 12 and an associated computing device 14 coupled to the telephony device 12, traditional telephone 16, or any other device operable to establish a communications link. Thus, in the scenario discussed above, telephony device 12b and/or computing device 14b may be referred to as the remote device. On the other hand, if audio link 24 was established with telephony device 12d, telephony device 12d would be the remote device.

After establishing audio link 24, telephony device 12 may communicate a message, notice, or other appropriate signal to computing device 14 associated with telephony device 12 to inform computing device 14 that audio link 24 has been established with a remote device. For example, after telephony device 12a establishes audio link 24 with telephony device 12b, telephony device 12a may communicate a signal to computing device 14a to inform computing device 14a of the establishment of audio link 24 with telephony device 12b.

In response to receiving a signal announcing the establishment of audio link 24 and/or at any other appropriate time, computing device 14 may request identification of media capabilities, including enhanced media capabilities, associated with the remote device. For example, computing device 14 may tunnel a request to the remote device in audio link 24. For convenience in this discussion, tunneling represents encapsulating data or messages in packets conforming to a protocol used by network elements and embedding the packets in a stream of packets flowing through a communication link. For example, signaling or video data may be encapsulated in packets conforming to RTP for transmission as enhanced media packets over audio link 24 by telephony devices 12. Tunneled data packets may be identified as tunneled data packets by one or more unique identifiers in headers associated the packets. The unique identifiers may identify payload types of the packets. For example, unused header numbers associated with a protocol such as RTP may be used to identify tunneled packets.

As mentioned above, a request for media capabilities may be encapsulated in packets conforming to an appropriate protocol and transmitted over audio link 24. For example, computing device 14 may send packets that encapsulate the request to telephony device 14. After receiving the packets, telephony device 14 may embed the packets in a stream of audio packets communicated through audio link 24. In this manner, computing devices 14 may use tunneled signaling to exchange media capabilities or other appropriate information.

Telephony device 12 receives audio and tunneled packets sent in audio link 24. For example, telephony device 12 may receive tunneled packets that encapsulate a communication identifying media capabilities associated with the remote device. Telephony device 12 may forward the packets to computing device 14 after determining that the packets are tunneled packets encapsulating data for use by computing device 14. Upon receiving packets identifying media capabilities associated with the remote device, computing device 14 may identify enhanced media capabilities shared by computing device 14 and the remote device.

Alternatively or in addition, the remote device may initiate the request for identification of media capabilities. Furthermore, computing device 14 and/or the remote device may identify their own media capabilities without being requested to do so by the other.

After receiving a signal announcing the establishment of audio link 24, after common enhanced media capabilities have been identified, or at any other appropriate time, computing device 14 may send and receive enhanced media packets with the remote device. For example, when computing device 14a identifies an enhanced media capability shared with computing device 12b, computing device 14a may attempt to communicate enhanced media packets associated with the enhanced media capability to computing device 14b. Enhanced media packets, such as video packets, may be communicated in various ways. For example, computing device 14a may tunnel enhanced media packets using audio link 24. In the embodiment illustrated, telephony device 12b is associated with computing device 14b, so tunneled video packets received by telephony device 12b may be forwarded to computing device 14b.

Alternatively or in addition, computing device 14 may establish enhanced media link 26. For example, computing device 14a may tunnel or otherwise communicate enhanced media packets to computing device 14b using enhanced media link 26. The establishment of enhanced media link 26 may or may not include use of call manager 20. When call manager 20 is utilized to establish enhanced media link 26, signaling link 22 coupling telephony device 12 to call manager 20 through network 18 may be used to send and receive signaling information. Furthermore, telephony device 12, when coupled with computing device 14, may represent itself in packets communicated in signaling link 22 as having any of numerous enhanced media capabilities associated with computing device 14, such as a video capability, a word processing capability, an instant messaging software, a file transfer capability, and/or other enhanced media capabilities. Thereafter, call manager 20 may treat telephony device 12 as having all of the identified media capabilities. For example, call manager 20 may select a bandwidth or otherwise direct telephony devices 12, and therefore computing devices 14, to establish enhanced media link 26. Thus, for example, call manager 20 may help establish enhanced media link 26 between computing device 14a and 14b. In this manner, telephony device 12 may act as a proxy for computing device 14 in interactions with call manager 20. This may eliminate the need to update or change the signaling components of call manager 20 or existing protocols like SCCP. Alternatively, computing device 14 may act separately or independently from call manager 20.

When communicating enhanced media packets through audio link 24 and/or enhanced media link 26, various streams of data packets may be synchronized. For example, a stream of audio packets communicated by telephony device 12 may be synchronized with a stream of enhanced media packets communicated by computing device 14 using one of various methods. Audio packets communicated to a remote device using audio link 24 and video packets communicated to the same remote device using enhanced media link 26 may be synchronized, for example, using a common virtual clock. Packets in each stream that are communicated at the same time may share a common timestamp. Using the timestamp, a remote device may synchronize the streams even if the streams reach the remote device in an unsynchronized fashion.

Telephony devices 12 may also operate to disestablish communications. For example, a user of telephony device 12 may indicate to telephony device 12 to end a communication session by hanging up, placing a call on hold, transferring an audio link, or indicating other commands. One or all of the indications may operate to disestablish any audio links 24 and/or enhanced media links 26. Furthermore, telephony device 12 may indicate a user's desire to disestablish communications by sending a message or otherwise signaling to computing device 14. Upon receiving the notice, signal, or other notification, computing device 14 may disestablish any video communication stream, such as enhanced media link 26. For example, consider audio link 24 between telephony devices 12a and 12b and enhanced media link 26 between computing devices 14a and 14b. If a user of telephony device 12b places communications on hold, telephony device 12b may disestablish the audio link and notify computing device 14b. Computing device 14b may then disestablish enhanced media link 26. Both communications links may be reestablished when the user takes the communications off of hold.

Alternatively, if a user of telephony device 12b indicates to telephony device 12b to transfer the communication links to telephony device 12c, telephony device 12b may notify computing device 14b and disestablish audio link 24 between telephony device 12a and 12b. In response to receiving notification of the transfer, computing device 14b may disestablish any enhanced media link 26 established between computing device 14a and computing device 14b. Participants in any transferred communications may establish a new audio link 24 and/or a new enhanced media link 26 using the same or similar steps described above with regard to the establishment of the original link. Note, however, that enhanced media link 26 may not be established when telephony device 12 does not have an associated computing device 14. As illustrated, this would be the case, for example, if communications were transferred to telephony device 12d or traditional telephone 16. In this case, enhanced media link 26 would not be reestablished.

Thus, communication system 10 illustrates one arrangement and assortment of elements that may identify common media capabilities to enable communication of enhanced media packets through audio links 24 and/or enhanced media links 26.

Figure 2:
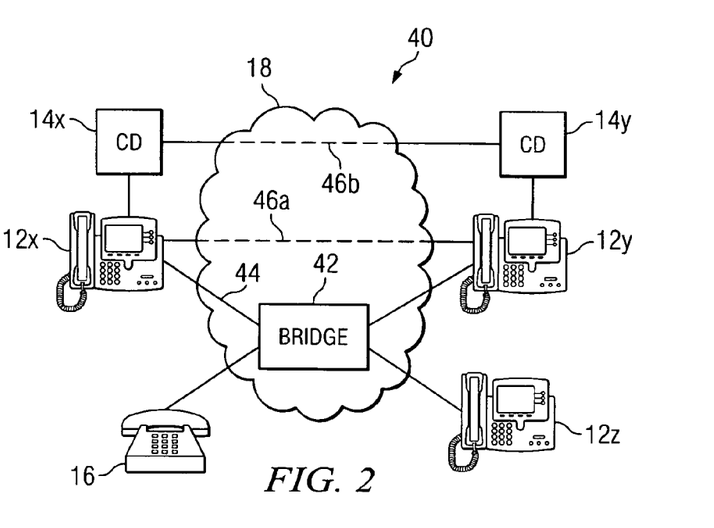
FIG. 2 illustrates a conferencing system having packet-based telephony devices, computing devices, and a bridge operating in accordance with principles of the present invention.

FIG. 2 illustrates a conference system, indicated generally at 40, that includes multiple packet-based telephony devices 12, multiple computing devices 14, a traditional telephone 16, and a conference bridge 42 that resides within network 18. In general, bridge 42 provides conferencing services to enable enhanced media communications between one or multiple elements of system 40. Within network 18, elements may interconnect using various links, such as conference link 44 and sidebar link 46. During a conference, a particular element, such as a particular telephony device 12 or a particular computing device 14, may communicate information, for example audio packets and/or video packets, to all conference participants or to one or more selected participants of the conference using various links.

Within system 40, bridge 42 provides conferencing services to one or more elements. Bridge 42 represents any suitable combination and arrangement of hardware, including any appropriate controlling logic, that can facilitate communication of information between multiple elements of system 40. While illustrated as a separate component of system 40, it should be apparent that the illustrated diagram is not necessarily literal, and the functions of bridge 42 may be incorporated within or distributed among any suitable elements. Thus, for example, the functions of bridge 42 may be provided within selected and/or each telephony device 12.

Conference link 44 represents a conference communication path between one or more conference participants and bridge 42. Conference link 44 may carry audio packets as well as any other data packet conforming to a protocol used by conference link 44. Thus, in particular embodiments, enhanced media packets may be communicated through conference link 44, so long as the enhanced media packets conform to the appropriate protocol used by conference link 44. Conference link 44 may utilize any of various transport and signaling protocols appropriate for audio communications over networks. Conference link 44 may pass through one or more firewalls within network 18.

Sidebar link 46 represents a dedicated communication path between two elements of system 40. Sidebar link 46 may carry audio packets as well as any other data packet conforming to a protocol used by sidebar link 46. Thus, in particular embodiments, enhanced media packets may be communicated through sidebar link 46, so long as the enhanced media packets conform to the appropriate protocol used by sidebar link 46. Sidebar link 46 may utilize any of various transport and signaling protocols appropriate for communications over networks. Sidebar link 46 may pass through one or more firewalls within network 18.

In operation, bridge 42 may establish a conference among multiple elements within system 40. For example, bridge 42 may allow multiple remote devices to join a particular conference. A conference may include any number, arrangement, and assortment of conference participants. For example, a conference may include multiple telephony devices 12, and some of the telephony devices 12 may be coupled with associated computing devices 14. A conference may also include one or more traditional telephones 16 and/or any other device or devices operable to join the conference. Furthermore, while in the embodiment illustrated a specific number of each type of conference participant is used, alternative embodiments may include zero, one, two, or more than two of each type of conference participant.

Each participant in a conference includes at least one media capability. For example, a traditional telephone 16 includes an audio communication capability. Telephony device 12 also includes an audio communication capability. Telephony device 12, when coupled with computing device 14, may represent itself as having any of numerous enhanced media capabilities associated with computing device 14, such as a video capability, a word processing capability, an instant messaging software, and/or other enhanced media capabilities.

When bridge 42 receives packets, bridge 42 may distinguish audio packets from enhanced media packets tunneled in conference link 44. Various methods may be used to distinguish packet types. For example, packets may include unique identifiers in headers that identify whether the packets include audio data or enhanced media data. After identifying packets as audio packets, bridge 42 may extract audio data from the packets and perform any of various processes. For example, bridge 42 may analyze the audio data to determine a quality or other characteristic of the audio data, determine whether to select and mix the audio data into an audio conference stream, and select and mix the audio data into the audio conference stream as appropriate. Alternatively or in addition, bridge 42 may simply redirect the audio packets to one or more of the conference participants without processing.

After identifying enhanced media packets, bridge 42 may perform any of various other processes. In some embodiments, bridge 42 may receive messages identifying media capabilities associated with particular conference participants. Bridge 42 may redirect messages identifying media capabilities associated with particular conference participants to the other conference participants. Alternatively or in addition, bridge 42 may record media capabilities associated with the conference and use the information in various ways. For example, bridge 42 may compare the media capabilities of each conference participant with the media capabilities of a particular conference participant to determine commonalities. Furthermore, when bridge 42 receives an enhanced media packet from a conference participant, bridge 42 may identify and communicate the enhanced media packet to all or selected conference participants with the associated enhanced media capability. For example, after a conference has been established, bridge 42 may receive a stream of packets that identify a particular enhanced media capability, such as video. Bridge 42 may communicate the stream of packets to conference participants that identified video as one of their media capabilities.

Each conference participant may also compare media capabilities identified in messages received from bridge 42 with its own media capabilities to determine commonalities. When a common enhanced media capability exists, a conference participant may tunnel enhanced media packets to a remote device through conference link 44. Alternatively or in addition, the conference participant may establish sidebar link 46 with the remote device and communicate enhanced media packets through sidebar link 46 to the remote device. For example, computing device 14x may tunnel enhanced media packets to computing device 14y using conference link 44. Alternatively or in addition, computing device 14x may communicate enhanced media packets to computing device 14y using sidebar link 46b. Furthermore, telephony device 12x may communicate information to telephony device 12y using sidebar link 46a.

Thus, conference system 40 illustrates one arrangement and assortment of elements that may identify common media capabilities to enable communication of enhanced media packets through conference link 44 and/or sidebar links 46.

Figure 3A:
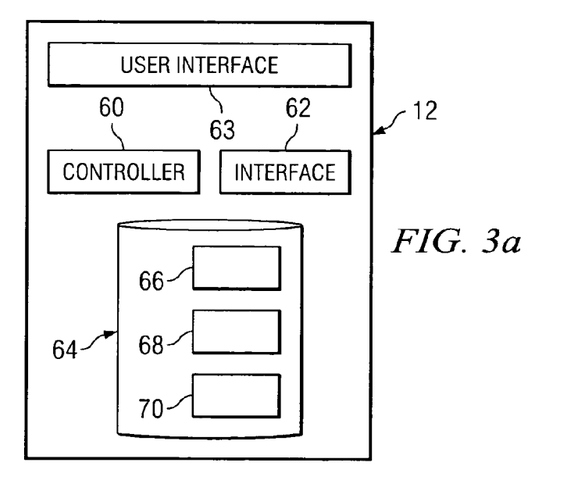
FIG. 3a is a block diagram illustrating functional components of a packet-based telephony device.

FIG. 3A is a block diagram illustrating functional components of a telephony device 12 that operates in accordance with various embodiments of the present invention. Telephony device 12 includes a controller 60, an interface 62, and a memory 64. These functional elements operate to support media communications in accordance with the present invention. In general, telephony device 12 is operable to couple to a local computing device 14, to establishes audio links 24 with remote devices, to communicate audio packets to remote devices, and to tunnel enhanced media packets to remote devices.

Controller 60 controls the operation and administration of elements within telephony device 12. For example, controller 60 operates to process information received from interface 62 and memory 64. Controller 60 includes any hardware and/or logic elements operable to control and process information. For example, controller 60 may be a microcontroller, processor, programmable logic device, and/or any other suitable processing device.

Interface 62 communicates information to and receives information from any device coupled to telephony device 12. Thus, interface 62 may include one or multiple interfaces to communicate with local devices and with remote devices over network 18. For example, when telephony device 12 is coupled to a local computing device 14, interface 62 can communicate information to and receive information from local computing device 14. When telephony device 12 establishes an audio link 24 or another appropriate type of communication link with a remote device, interface 62 can communicate information to and receive information from the remote device. For example, interface 62 can transmit audio packets and other packets conforming to the audio communication protocol to the remote device. Thus, interface 62 represents any suitable hardware or controlling logic used to communicate information to or from elements linked to telephony device 12.

User interface 63 communicates information to and receives information from a user of telephony device 12. For example, through user interface 63 a user can input information and control processes performed by controller 60. Also, user interface 63 can communicate results of processes performed by controller 60. For example, a user may communicate dialing information to controller 60 through user interface 63. User interface 63 may also receive audio information from and transmit audio information to a user. Thus, user interface 63 represents any suitable hardware or controlling logic, such as a keypad, depressible buttons, telephone handset, microphone, speaker, display, or any other suitable elements used to communicate information to or from a user of telephony device 12.

Memory 64 stores, either permanently or temporarily, data and other information for processing by controller 60 and for use by other elements in telephony device 12. Memory 64 represents any one or a combination of volatile or non-volatile local or remote devices suitable for storing information. For example, memory 64 may include RAM, ROM, magnetic storage devices, optical storage devices, or any other suitable information storage device or a combination of these devices. Memory 64 may store information for communication to remote devices, information received from remote devices, computer programs for use by telephony device 12, or other suitable information. As illustrated, memory 64 may include one or more memory modules, such as communication module 66. Communication module 66 represents logic capable of controlling transmission and reception of audio packets to and from remote devices and any device coupled to telephony device 12, such as computing device 14. Communication module 66 includes instructions related to tunneling enhanced media packets received from computing device 14 to a remote device using an appropriate audio protocol.

In operation, controller 60 may associate telephony device 12 with computing device 14. For example, when a local computing device 14 is coupled to telephony device 12 using interface 62, controller 60 may use instructions found in communication module 66 to establish a virtual connection with local computing device 14. Once established, computing device 14 may communicate information to telephony device 12 through interface 62. The information may include identification of enhanced media capabilities associated with computing device 14, enhanced media packets, or other appropriate information. Also, telephony device 12 may communicate information, such as tunneled media packets, to computing device 14 using interface 62.

Controller 60 may establish audio link 24 with a remote device. For example, a user may input a telephone number or other identifier of a remote device using user interface 63. User interface 63 may communicate the telephone number to controller 60, which may use the telephone number and instructions found in communication module 66 to contact the remote device. To support establishment of audio link 24, controller 60 may also establish signaling link 22 with call manager 20. Alternatively or in addition, controller 60 may receive a call from a remote device. Once audio link 24 is established, information may be communicated between telephony device 12 and the remote device. Media capabilities, audio packets, and enhanced media packets may be exchanged. For example, controller 60 may communicate audio packets and tunnel enhanced media packets received from a local computing device 14 coupled to interface 62 to a remote device using audio link 24. Controller 60 may establish audio link 24 in any of various ways as to allow packets to pass through firewalls in network 18.

While this example includes specific functional components for telephony device 12, telephony device 12 may contain any collection and arrangement of components, including some or all of the enumerated functional components, for establishing media communication links. Moreover, telephony device 12 contemplates implementing each of the functional components using any suitable combination and arrangement of hardware and/or logic, and implementing any of the functionalities using a computer program stored on a computer readable medium.

Figure 3B:
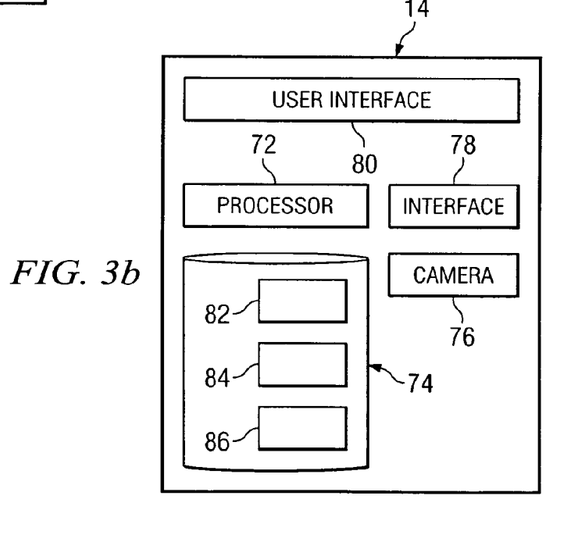
FIG. 3b is a block diagram illustrating functional components of a computing device.

FIG. 3B is a block diagram illustrating functional components of computing device 14. In the embodiment illustrated, computing device 14 includes a processor 72, a memory 74, a camera 76, an interface 78, and a user interface 80. In general, computing device 14 operates in conjunction with telephony device 12 to provide enhanced communications. For example, computing device 14 may be used to communicate enhanced media packets over network 18.

Processor 72 controls the operation and administration of elements within computing device 14. For example, processor 72 operates to process information and/or commands received from interface 78, memory 74, and camera 76. Processor 72 includes any hardware and/or logic elements operable to control and process information. For example, processor 72 may be a microcontroller, processor, programmable logic device, and/or any other suitable processing device.

Memory 74 stores, either permanently or temporarily, data and other information for processing by processor 72 and for use by other elements in computing device 14. Memory 74 represents any one or combination of volatile or non-volatile local or remote devices suitable for storing information. For example, memory 74 may include random access memory (RAM) device, read only memory (ROM) devices, magnetic storage devices, optical storage devices, or any other suitable information storage devices or combination of these devices. Memory 74 may store information in one or more modules, such as an enhanced media module 82 and a user interface module 84. Enhanced media module 82 includes instructions for establishing an enhanced media link 26 with a remote device and communicating enhanced data packets using enhanced media link 26. User interface module 84 includes information related to displaying information associated with enhanced media link 26 or any other media session.

Camera 76 represents any hardware and associated software operable to capture visual information. For example, camera 76 may be any of various digital and/or video cameras. In one embodiment, camera 76 may be a Logitech Quick Cam 4000 Pro. Although illustrated as being housed internal to computing device 14, it should be noted that camera 76 may be housed internal to or external to computing device 14. For example, camera 76 may be housed external to computing device 14 and coupled to interface 78. Furthermore, camera 76 may be housed internal to or external to telephony device 12. Camera 76 may have various set or configurable characteristics related to picture quality, including a frame rate, brightness, tint, saturation, contrast control, color on/off, and other similar qualities.

Interface 78 communicates information to and receives information from any device coupled to computing device 14. Thus, interface 78 may include one or multiple interfaces to communicate with one or more devices. For example, when computing device 14 is coupled to a local telephony device 12, interface 78 can communicate information to and receive information from local telephony device 12. When computing device 14 establishes a communication link, such as enhanced media link 26 or sidebar link 46, with a remote device, interface 78 can communicate information to and receive information from the remote device. For example, interface 78 can transmit video packets generated by camera 76 to a remote device. Thus, interface 78 represents any suitable hardware or controlling logic used to communicate information to or from elements linked to computing device 14.

User interface 80 communicates information to and receives information from a user of computing device 14. For example, using user interface 80, a user can view video associated with video packets received through interface 78. A user can also control aspects of enhanced media communications established by computing device 14 using user interface 80. Thus, user interface 80 represents any suitable hardware or controlling logic, such as a keyboard, mouse, monitor, display, or any other appropriate device, used to communicate information to or from a user of computing device 14.

In operation, processor 72 may associate computing device 14 with telephony device 12. For example, when computing device 14 is coupled to telephony device 12 locally using interface 78, processor 72 may use instructions found in memory 74 to establish a virtual connection with telephony device 12. Once established, computing device 14 may communicate information to telephony device 12 using interface 78. The information may include identification of enhanced media capabilities associated with computing device 14, enhanced media packets, or other appropriate information. Also, telephony device 12 may communicate information, such as tunneled media packets, to computing device 14 through interface 78.

Processor 72 may execute instructions found in enhanced media module 82 to communicate enhanced media packets through interface 79. Processor 72 may establish links, such as enhanced media links 26 and/or sidebar links 46, with remote devices to communicate enhanced media packets. Processor 72 may establish enhanced media links 26 in any of various ways as to allow packets to pass through firewalls in network 18. Alternatively or in addition, processor 72 may tunnel enhanced media packets through audio link 24 and/or conference link 44. For example, camera 76 may generate video packets for transmittal through interface 78 to remote devices, and interface 78 may receive enhanced media packets from remote devices. User interface 80 may display the transmitted and/or received enhanced media packets.

In one embodiment, after the establishment of a communications link, a pop-up window automatically displays information associated with received enhanced media packets. For example, when telephony device 12 forwards tunneled video packets received from a remote device to interface 78 of computing device 14 using audio link 24, processor 72 may automatically launch a window using user interface 80 to display video information in the tunneled video packets. As another example, when computing device 14 receives notification that a remote device shares an instant messaging capability with computing device 14, processor 72 may automatically launch an instant-messaging window using user interface 80 to display information associated with instant messaging packets that may be communicated between the devices. Note that processor 72 may automatically launch any appropriate enhanced media window at any appropriate time. Alternatively or in addition, processor 72 may prompt a user using user interface 78 to confirm the user's desire to display enhanced media information using user interface 78. This confirmation may occur during configuration, at the time enhanced media packets are received by computing device 14, or at any other appropriate time.

While this example includes specific functional components for computing device 14, computing device 14 may include any collection and arrangement of components, including some or all of the enumerated functional components, for establishing media communication links. Moreover, computing device 14 contemplates implementing each of the functional components using any suitable combination and arrangement of hardware and/or logic, and implementing any of the functionalities using a computer program stored on a computer readable medium. Thus, in one embodiment computing device 14 is a personal computer. In other embodiments, computing device 14 may be a television, PDA, dedicated video conference equipment, or other device operable to coordinate enhanced communications based on audio links established by an associated telephony device 12.

Figure 3C:
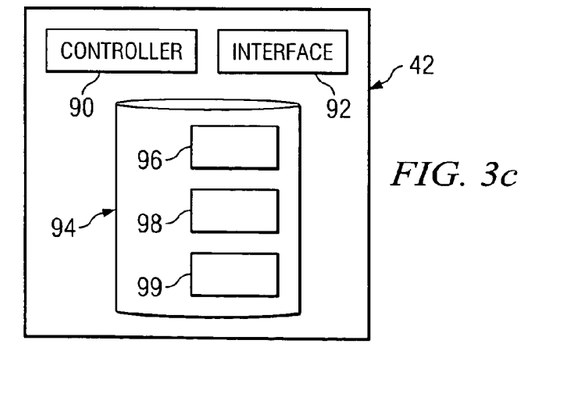
FIG. 3c is a block diagram illustrating functional components of a bridge.

FIG. 3C is a block diagram illustrating functional components of conference bridge 42. In general, bridge 42 establishes communication links among multiple conference participants. Bridge 42 includes a controller 90, an interface 92, and a memory 94. Bridge 42 supports traditional audio conference capabilities. Bridge 42 may also support enhanced media communications between conference participants. However, in some embodiments, bridge 42 may not support enhanced media communications.

Controller 90 controls the operation and administration of elements within bridge 42. For example, controller 90 operates to process information received from interface 92 and information stored in memory 94. Controller 90 includes any hardware and/or logic elements operable to control and process information. For example, controller may be a microcontroller, processor, programmable logic device, and/or any other suitable processing device.

Interface 92 communicates information to and receives information from remote devices coupled to bridge 42. Thus, interface 92 may include one or multiple interfaces to communicate with remote devices over network 18. For example, through interface 92, a remote device can transmit information for use by controller 90. Thus, interface 92 represents any suitable hardware or controlling logic used to communicate information to or from elements linked to bridge 42. Furthermore, interface 92 may support multiple protocols appropriate for communications over networks.

Memory 94 stores, either permanently or temporarily, data and other information for processing by controller 90 and for use by other elements in bridge 42. Memory 94 represents any one or a combination of volatile or non-volatile local or remote devices suitable for storing information. For example, memory 94 may include RAM, ROM, magnetic storage devices, optical storage devices, or any other suitable information storage devices or a combination of these devices. As illustrated, memory 94 may include one or more modules, such as redirect module 96 and media capabilities module 98. Redirect module 96 may include instructions for redirecting information received from one remote device to a plurality of other remote devices, such as remote devices coupled to a conference associated with bridge 42. Media capabilities module 98 may include media capabilities associated with remote devices in one or more conferences associated with bridge 42.

In operation, multiple remote devices couple to bridge 42 to create a conference. Each conference participant joins the conference and feeds bridge 42 with an audio stream. Some or all of the audio streams may be audio packet streams. Controller 90 mixes selected audio information received from conference participants into a conference audio stream that is fed back to the conference participants using interface 92. For example, controller 90 may analyze incoming audio information to identify one or more loudest speakers and mix the audio information associated with the loudest speaker or speakers into the conference audio stream.

Bridge 42 may detect enhanced media packets embedded in incoming streams. Controller 90 may detect enhanced media packets in various ways. For example, controller 90 may inspect headers of packets to determine types of payloads. Audio packets may include headers that identify audio information payloads, while enhanced media packets may include headers that identify enhanced media information payloads. Furthermore, within the category of enhanced media packets, multiple unique identifiers may be used to identify different types of enhanced media packets. For example, enhanced media packets that identify media capabilities may use one identifier, enhanced media packets that include video information may use a second identifier, and enhanced media packets that include file transfer information may use a third identifier. Note that the number of unique identifiers may be limited based upon the number of identifiers available within a particular protocol such as RTP.

After detecting enhanced media packets, controller 90 may tunnel the enhanced media packets in the conference audio stream to all conference participants or redirect enhanced media packets as appropriate. For example, controller 90 may receive enhanced media packets from a particular remote device that identify media capabilities associated with the remote device. According to the instructions stored in redirect module 96, controller 90 may redirect the enhanced media packets to one or more conference participants with or without analyzing the media capabilities identified. For example, controller 90 may redirect the enhanced media packets to conference participants that share one or more enhanced media capabilities after analyzing the media capabilities identified. Alternatively or in addition, controller 90 may store the media capabilities in media capabilities module 98 for later reference by controller 90.

Alternatively or in addition, controller 90 may receive enhanced media packets from a particular device that include video, instant message, word processing, or other enhanced media information. According to instructions in redirect module 96, controller 90 may redirect the enhanced media packets to one or more conference participants. For example, controller 90 may redirect the enhanced media packets to conference participants that share one or more enhanced media capabilities associated with the enhanced media packets. If video packets are received, controller 90 may reference media capabilities module 98 to identify conference participants that share a video capability and then forward the video packets to the identified conference participants. If word processing packets are received, controller 90 may reference media capabilities module 98 to identify conference participants that share a word processing capability and then forward the word processing packets to the identified conference participants. Forwarding the enhanced media packets may include tunneling the enhanced media packets in the conference audio stream.

While this example includes specific functional components for bridge 42, bridge 42 may contain any collection and arrangement of components, including some or all of the enumerated functional components, for establishing media communication links. Moreover, bridge 42 contemplates implementing each of the functional components using any suitable combination and arrangement of hardware and/or logic, and implementing any of the functionalities using a computer program stored on a computer readable medium.

Figure 4:
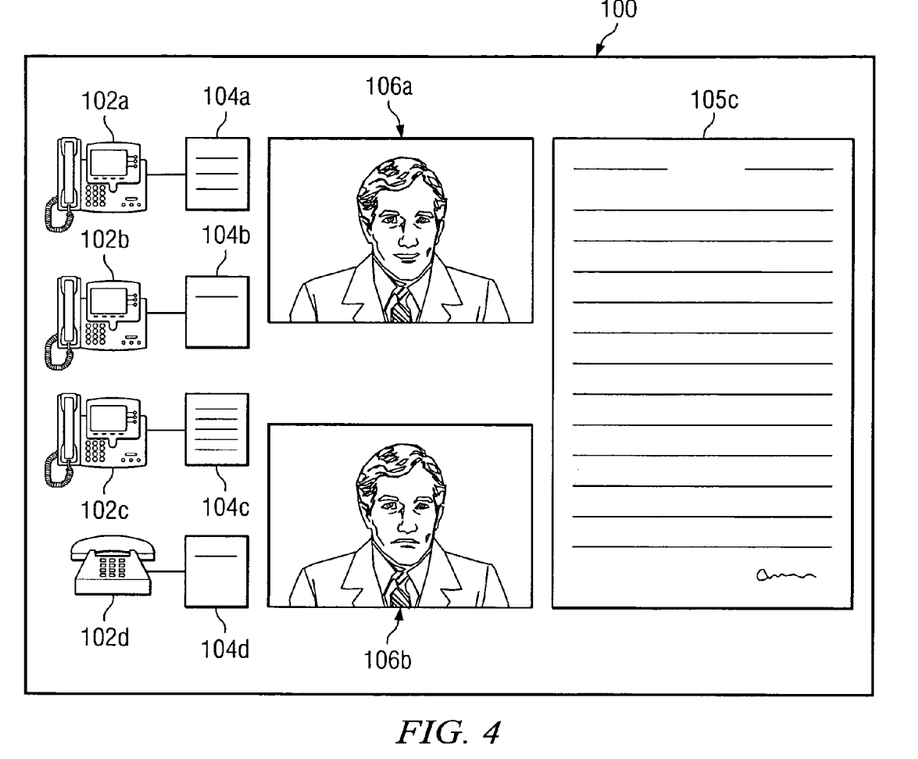
FIG. 4 is a block diagram illustrating aspects of a user interface associated with a computing device.

FIG. 4 illustrates a graphical user interface (GUI) 100 that may be associated with one or more computing devices 14. In general, GUI 100 displays information related to communication system 10 and/or conference system 40. In the embodiment illustrated, GUI 100 includes multiple device icons 102, multiple capability icons 104 associated with device icons 102, and three windows 106. Although illustrated in connection with a communications conference, the functionalities of GUI 100 may also be utilized in an end-to-end communication session between only two remote devices.

Device icons 102 represent graphical depictions of one or more participants in an audio and/or enhanced media communication session. As illustrated, device icons 102 represent remote devices participating in a communications conference. Device icons 102 may be one or more of various shapes, including shapes associated with the particular remote device. For example, device icons 102a, 102b, and 102c represent remote devices that are telephony devices 14, while device icon 102d represents a remote device that is traditional telephone 16. While specific graphical elements have been used to represent device icons 102, any of various shapes and sizes may be used to represent device icons 102.

Each device icon 102 is associated with a capability icon 104. Capability icons 104 are graphical representations of the media capabilities of remote devices associated with device icons 102. For example, capability icon 104a represents media capabilities, including enhanced media capabilities, associated with the remote device represented by device icon 102a. While illustrated as a list of media capabilities, capability icons 104 may be any of various shapes and sizes, and may include graphical representations as well as text.

Device icons 102 and/or capability icons 104 may also provide a method for a user of GUI 100 to establish communication links with one or more remote devices. A user may use a pointing instrument to select a remote device and/or a media capability associated with a remote device. This selection may cause a communication link to be established with the selected remote device to enable communication using a selected media capability. For example, when a user selects a particular device icon 102, sidebar link 46 may be established to transmit and receive data from the participant associated with the selected device icon 102. Alternatively or in addition, the selection of a remote device and/or a media capability associate with a remote device may cause packets to be tunneled to the remote device. For example, when a user selects a particular capability icon 104, media packets associated with the selected capability icon 104 may be tunneled to the participant associated with the selected capability icon 104 using conference link 44. Note that one, a subset, or all conference participants may be communicated with using one or more sidebar links 46 or by tunneling media packets through conference link 44.

Windows 106 operate to display enhanced media information associated with enhanced media packets transmitted and/or received during a communication session. Windows 106 may display enhanced media packets associated with a remote device, a local device, or both a local and a remote device. Windows 106 may be any of various sizes and shapes, and may be floating or fixed within GUI 100. In some embodiments, window 106 displays video information from video packets associated with whoever is speaking at a current moment in time in a communications conference. Alternatively or in addition, window 106 may be configured to always show a particular participant. Moreover, window 106 may be configured to pop up or launch automatically when a communications link is established and/or when enhanced media packets are transmitted and/or received.

For example, windows 106b and/or 106c may launch automatically when sidebar link 46 is established. As illustrated, window 106b may show video information tunneled through conference link 44 by a particular remote device, while window 106c may show other enhanced media information associated with a particular sidebar link 46, such as data from a word processing or other type of software application.

In operation, a user of GUI 100 may select a media capability by clicking on capability icon 104, and enhanced media packets may be transmitted to and received from a remote device associated with the selected capability icon 104. For example, if a user selects an enhanced media capability such as a word processing application associated with capability icon 104c, window 106c may be launched automatically. Note that an event or service occurs automatically when little or no further user instruction or interaction is necessary to cause a result. For example, enhanced media packets may be tunneled to a remote device or an appropriate enhanced communication link may be established with the remote device without further user instruction beyond selecting a particular enhanced media capability associated with capability icon 104.

Figure 5:
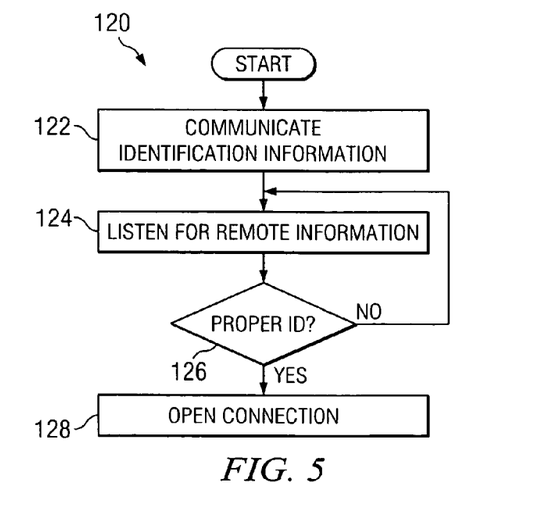
FIG. 5 is a flowchart illustrating a method for opening a connection between a packet-based telephony device and a computing device.

FIG. 5 is a flowchart illustrating a method 120 for associating a telephony device 12 with a computing device 14. Telephony device 12 and computing device 14 may be coupled to one another via a cable such as a USB or network cable, a network, or by any other appropriate wireline or wireless connection. However, telephony device 12 and computing device 14 may be prevented from associating with one another until a virtual connection is established.

Telephony device 12 and computing device 14 each communicate identification information at step 122. Identification information may include a network address associated with the device, a type identifier of the device, a specific device identification number, and/or any other information operable to identify the device. For example, telephony device 12 may communicate its network address and the fact that it is a telephony device. Computing device 14 may communicate its network address and the fact that it is a computing device. In certain embodiments, a device may communicate the identification information periodically without being requested to do so.

Each device listens for remote information at step 124. Remote information is any information received from a remote device, and may include identification information associated with the remote device. Each device determines whether the remote information is proper identification information at step 126. The remote information may be identification information, yet still be improper. For example, telephony device 12 may not desire to open a virtual connection with another telephony device 12, and thus the remote information may be identification information and yet still be improper. If the remote information is not identification information at all, or if the remote information is identification information but improper, the device continues to listen for remote information at step 124. If, on the other hand, the remote information is identification information and is proper, the device opens a virtual connection with the remote device at step 128. Identification information may be proper if the device is telephony device 12 and the remote information is identification information identifying the remote device as computing device 14. Similarly, identification information may be proper when computing device 14 receives remote information identifying telephony device 12. In some embodiments, remote information may only be proper when the remote information identifies a local IP address.

Once the virtual connection is made, telephony device 12 may notify computing device 14 of various events occurring on telephony device 12. Furthermore, telephony device 12 may send keep-alive signals to computing device 14 and receive acknowledgments from computing device 14. These signals and acknowledgements may ensure that the devices continue to function correctly. Furthermore, telephony device 12 and computing device 14 may synchronize virtual clocks at this point. Synchronization may provide many benefits. For example, synchronization may allow audio and video communications to correspond.

The method associated with FIG. 5 may be implemented using TCP, UDP, or any other signaling protocol as appropriate, for example a proprietary signaling protocol such as Cisco discovery protocol (CDP). Furthermore, identification information and/or remote information may be limited to point-to-point transmittal, and may not be able to be transmitted out of subnetworks or beyond a next adjacent element on a network. Thus, in some embodiments virtual connections may not be able to be created over networks, but may only be able to created between locally cabled devices. Using these techniques, security of computing devices 14 and telephony devices 12 may be enhanced. For example, hackers may be prevented from accessing devices by impersonating communications elements coupling to computing device 14 and telephony device 12 over network 18.

Figure 6:
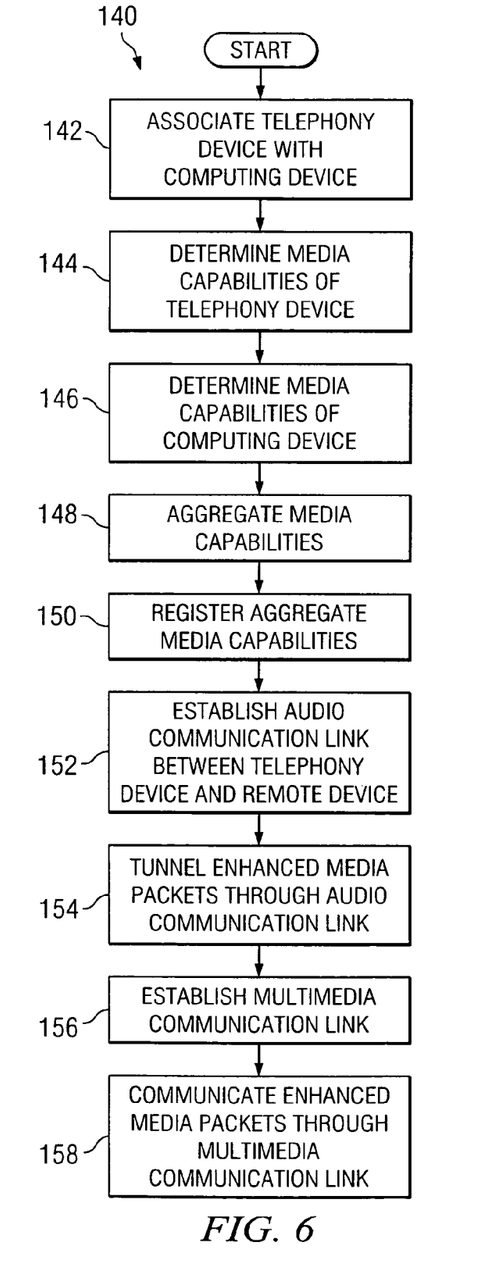
FIG. 6 is a flowchart illustrating a method for aggregating media capabilities for use in communications.

FIG. 6 illustrates a method 140 for aggregating media capabilities for use in communications. Telephony device 12 and computing device 14 are associated at step 142. Telephony device 12 and computing device 14 may be coupled to one another locally, for example, using a serial, USB, parallel, Ethernet, or any other appropriate connecting device. Telephony device 12 and computing device 14 may also be coupled together using a network or any other appropriate equipment to couple telephony device 12 and computing device 14 from remote locations. Once coupled, telephony device 12 and computing device 14 may attempt to recognize each other and establish a virtual connection.

Media capabilities of telephony device 12 are determined at step 144, and at least include an audio communication capability. Media capabilities of computing device 14 are determined at step 146. The media capabilities of the computing device may include one or more enhanced media capabilities. Enhanced media capabilities include capabilities such as video capability, instant messaging capability, file transfer capability, and any other capabilities of hardware and/or software on computing device 14 that extend beyond simple audio communication capability. The media capabilities of computing device 14 may be communicated to telephony device 12.

Telephony device 12 aggregates the media capabilities associated with telephony device 12 and the media capabilities, including enhanced media capabilities, associated with computing device 14 at step 148. For example, telephony device 12 may create a message identifying the media capabilities associated with telephony device 12 and the media capabilities, including any enhanced media capabilities, associated with computing device 14 as media capabilities associated with telephony device 12.

Telephony device 12 registers the aggregated media capabilities at step 150. For example, in one embodiment telephony device 12 may communicate the aggregated media capabilities to call manager 20. In another embodiment, telephony device 12 may communicate the aggregated media capabilities to bridge 42. Call manager 20 or bridge 42 may associate the aggregated media capabilities with telephony device 12 and record the aggregated media capabilities in a data structure. Call manager 20 or bridge 42 may maintain a record of the media capabilities for various devices in the data structure. The information in the data structure may be used in various ways. For example, call manager 20 or bridge 42 may use the information to establish appropriate communication links between devices and/or to communicate specific media capabilities to specific devices that request information on media capabilities of other devices.

At step 152 an audio communication link is established between telephony device 12 and a remote device, such as a traditional telephone 16, another telephony device 12, another telephony device 12 coupled with computing device 14, or bridge 42. The audio communication link, which may be audio link 24 or conference link 44, may be established in various ways. A user of a remote device may cause the remote device to establish audio link 24 or conference link with telephony device 12. Alternatively, a user of telephony device 12 may cause telephony device 12 to establish audio link 24. Alternatively or in addition, call manager 20 or bridge 42 may establish audio link 24 or assist telephony device 12 or the remote device in the establishment of audio link 24.

At step 154 enhanced media packets may be tunneled in the audio communication link. Tunneling enhanced media packets allows non-audio information to be communicated in the audio communication link. For example, non-audio information such as identification of enhanced media capabilities may be placed in packets suitable for communication over the audio communication link and communicated to the remote device. Similarly, video information may be packetized and embedded in audio streams. Non-audio information may also be communicated in the opposite direction from the remote device to telephony device 12 and computing device 14.

At step 156 a multimedia communication link is established. The multimedia communication link may be enhanced media link 26 or sidebar link 46. The multimedia communication link provides a dedicated path for communication of enhanced media packets, which are communicated through the multimedia communication link at step 158. Thus, media capabilities may be aggregated and used to enable communication of enhanced media packets between remote devices.

Figure 7:
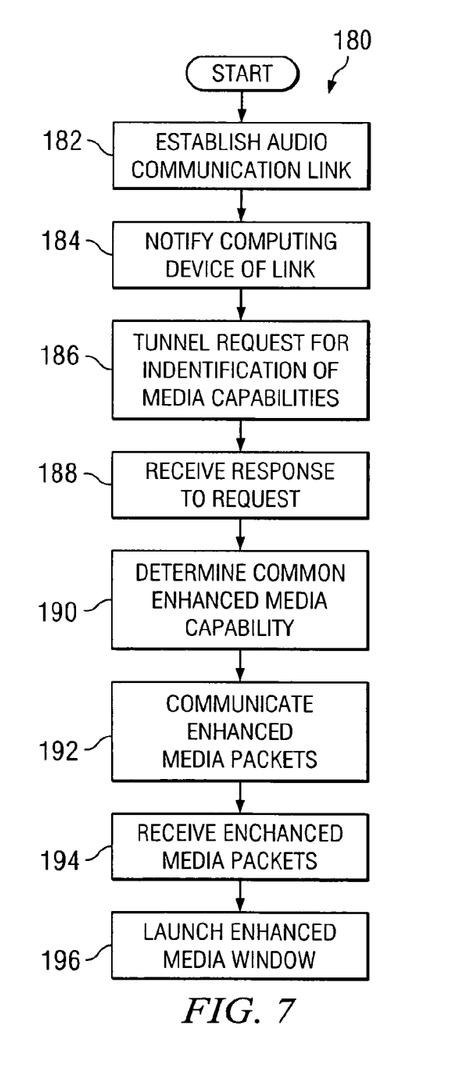
FIG. 7 is a flowchart illustrating a method for enhanced media communications between a computing device and a remote device.

FIG. 7 is a flowchart illustrating a method 164 for enhanced media communications between a computing device and a remote device. An audio communication link is established at step 166. For example, telephony device 12 may establish an audio communication link with a remote device. Telephony device 12 notifies computing device 14 of the audio communication link at step 168. At step 170, a request for identification of media capabilities is tunneled to the remote device in the audio communication link. For example, computing device 14 may generate a packet requesting identification of media capabilities associated with the remote device and then transmit the packet to an associated telephony device 12. Telephony device 12 may then forward the packet to the remote device using audio link 24. Computing device 14 receives a response advertising media capabilities of the remote device at step 188. For example, the remote device may tunnel a message to the associated telephony device 12 in audio link 24, and telephony device 12 may then forward this message to computing device 14. When the request is sent by the remote device, the response is tunneled by computing device 14. In addition, the remote device may tunnel a request for identification of media capabilities associated with computing device 14. In this case, computing device 14 may respond as appropriate with tunneled messages advertising media capabilities associated with computing device 14.

Computing device 14 determines common enhanced media capabilities at step 190. Enhanced media capabilities identified in the response may correlate with enhanced media capabilities associated with the computing device. For example, computing device 14 and the remote device may share a video communication capability. At this point, computing device 14 may automatically launch a window associated with a shared enhanced media capability. For example, a video window may be launched if computing device 14 and the remote device share the video communication capability. At step 192, computing device 14 communicates enhanced media packets in response to determining that a common enhanced media capability exists. In one embodiment, the enhanced media packets are tunneled to the remote device by computing device 14 in the audio communication link. In another embodiment, the enhanced media packets are communicated to the remote device in a multimedia communication link established between computing device 14 and the remote device. The multimedia communication link may be of the same or a different type when compared to the audio communication link.

Computing device 14 receives enhanced media packets sent from the remote device at step 194. In one embodiment the enhanced media packets will be tunneled to the computing device 14 by the remote device in the audio communication link. In another embodiment, the enhanced media packets will be communicated to computing device 14 using the multimedia communication link.

Computing device 14 launches window 106 at step 196. Window 106 may automatically launch when enhanced media packets are received by computing device 14. For example, when computing device 14 receives video packets, computing device 14 may automatically launch window 106 to display video information. Alternatively or in addition, computing device 14 may only launch window 106 when a user of computing device 14 requests to use window 106. As discussed above, window 106 may be an instant messaging window, a video window, a data processing window, or any other window associated with an enhanced media capability.

Thus, media capabilities may be communicated between remote devices and used to enable communication of enhanced media packets.

Figure 8:
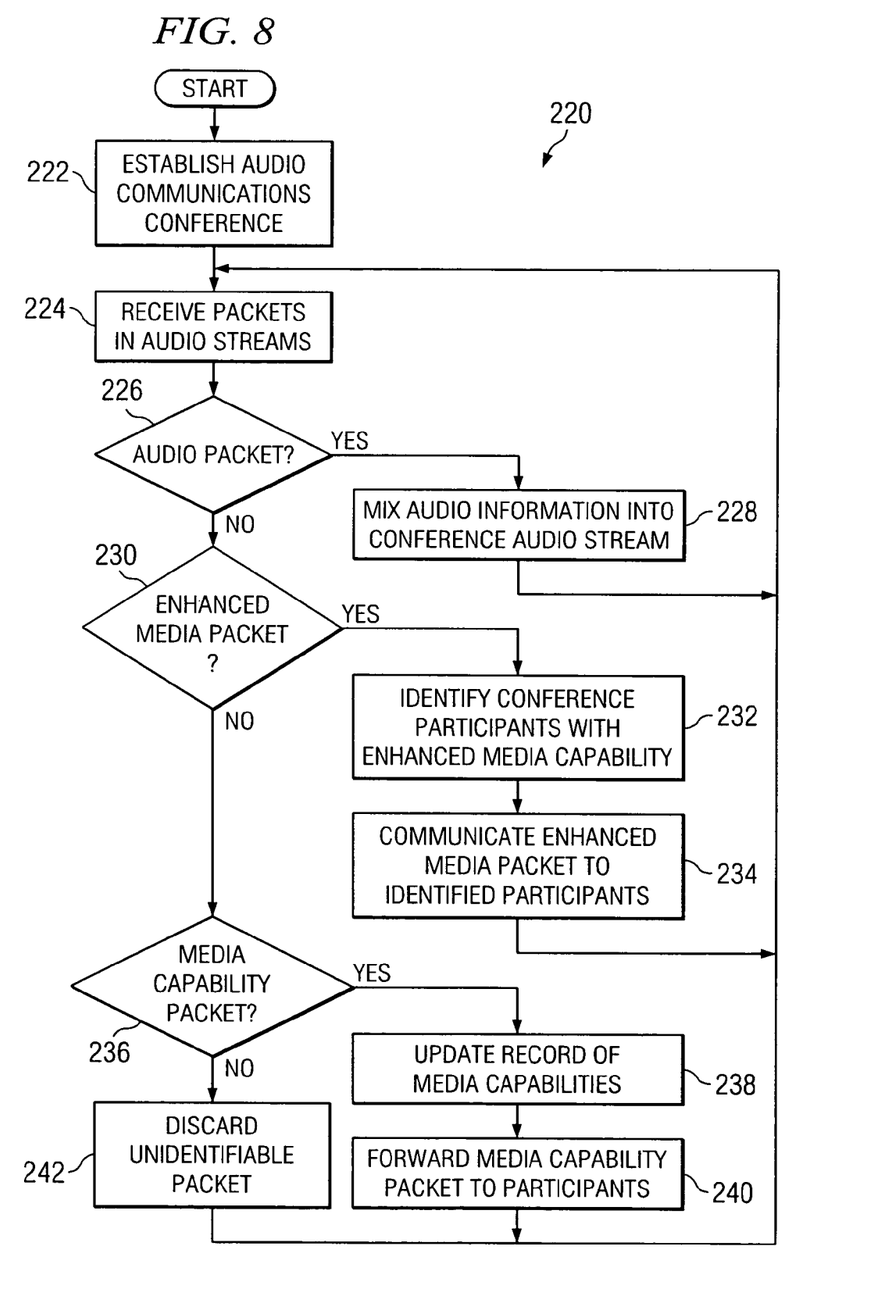
FIG. 8 is a flowchart illustrating a method for enhanced media communications in a conference.

FIG. 8 is a flowchart illustrating a method 220 for supporting enhanced communications in a communication conference. At step 222, bridge 42 establishes an audio communications conference. The audio communications conference may include multiple conference participants, and each conference participant may supply bridge 42 with a stream of audio packets in conference link 44. Bridge 42 receives data packets in conference link 44 at step 224. Bridge 42 determines whether the packet is an audio packet at step 226. If the packet is an audio packet, bridge 42 mixes audio information included in the audio packet with audio information included in other audio packets to produce a conference audio stream, which may be communicated to the conference participants at step 228.

Returning to step 226, if the packet is not an audio packet, bridge 42 determines whether the packet is an enhanced media packet at step 230. If the packet is an enhanced media packet, bridge 42 analyzes the enhanced media packet to determine what media capability is associated with the enhanced media packet, and identifies conference participants with the enhanced media capability at step 232. For example, if the enhanced media packet is associated with a video capability, bridge 42 identifies other conference participants with the video capability. At step 234, bridge 42 communicates the enhanced media packet to the conference participants identified. Thus, for example, bridge 42 may communicate video packets to conference participants capable of using the video packets. The enhanced media packets may be communicated by tunneling the enhanced media packets in conference link 44, in sidebar link 46, or in any other appropriate way. In these ways, bridge 42 may redirect enhanced media packets to one or more conference participants and may enable addressing of communications to individuals or groups.

Returning to step 230, if the received packet is not an enhanced media packet, bridge 42 determines whether the received packet is a media capability packet at step 236. If the received packet is a media capability packet, bridge 42 updates a record of media capabilities at step 238. The record of media capabilities is any appropriate data structure for recording media capabilities associated with individuals or groups of conference participants. For example, bridge 42 may include identifiers of conference participants in a group that only includes identifiers of conference participants capable of using a particular media. For example, a data structure may identify conference participants capable of instant messaging, displaying video information, or otherwise using any enhanced media packet. At step 240, bridge 42 forwards the media capability packets to one or more conference participants. Thereafter, individual conference participants may keep their own record of media capabilities associated with particular conference participants, and/or use the information in media capability packets to establish enhanced media communications with particular conference participants. For example, sidebar links 46 may be established to communicate enhanced media packets. Alternatively or in addition, enhanced media packets may be tunneled using conference link 44.

Returning to step 236, if the received packet is not a media capability packet, bridge 42 may discard the received packet as unidentifiable at step 242.

Thus, media capabilities may be communicated to bridge 42 and used to enable communication of enhanced media packets.

The preceding flowcharts illustrate particular methods for supporting communications. However, these flowcharts illustrate only exemplary methods of operation, and communication system 10 and conference system 40 contemplate devices using any suitable techniques, elements, and applications for performing these functions. Thus, many of the steps in the flowcharts may take place simultaneously and/or in different orders than as shown. In addition, the devices may use methods with additional steps or fewer steps, so long as the methods remain appropriate. Moreover, other devices of systems 10 and 40 may perform similar techniques to support communications.

Although the present invention has been described in several embodiments, a myriad of changes and modifications may be suggested to one skilled in the art, and it is intended that the present invention encompass such changes and modifications as fall within the present appended claims.

What is claimed is:

1. A method for supporting communications comprising:
   establishing, using a controller, a communications conference, the communications conference including a plurality of conference participants, each conference participant providing an audio stream;
   identifying, using a controller, audio data packets in the audio streams;
   mixing, using a controller, audio information from selected ones of the audio data packets to generate a conference audio stream;
   communicating, using an interface, the conference audio stream to the conference participants;
   identifying, using a controller, enhanced media packets embedded in at least one of the audio streams; and
   communicating, using an interface, the enhanced media packets to selected ones of the conference participants;
   wherein communicating the enhanced media packets to selected ones of the conference participants comprises identifying conference participants capable of using the enhanced media packets and communicating the enhanced media packets to the identified conference participants.

2. The method of claim 1, wherein communicating the enhanced media packets to selected ones of the conference participants comprises embedding the enhanced media packets in the conference audio stream.

3. The method of claim 1, wherein the selected ones of the conference participants consist of all conference participants except a particular conference participant that embedded the enhanced media packets in a particular audio stream in which the enhanced media packets were received.

4. The method of claim 1, wherein each selected one of the conference participants is operable to automatically display an enhanced media window in response to receiving the enhanced media packets.

5. The method of claim 1, wherein the enhanced media packets comprise video packets.

6. An apparatus supporting communications comprising:
   a controller operable to establish a communications conference, the communications conference including a plurality of conference participants, each conference participant providing an audio stream, to identify audio data packets in the audio streams, to mix audio information from selected ones of the audio data packets to generate a conference audio stream, and to identify enhanced media packets embedded in at least one of the audio streams; and
   an interface operable to communicate the conference audio stream to the conference participants and to communicate the enhanced media packets to selected ones of the conference participants;
   wherein communicating the enhanced media packets to selected ones of the conference participants comprises identifying conference participants capable of using the enhanced media packets and communicating the enhanced media packets to the identified conference participants.

7. The apparatus of claim 6, wherein communicating the enhanced media packets to selected ones of the conference participants comprises embedding the enhanced media packets in the conference audio stream.

8. The apparatus of claim 6, wherein the selected ones of the conference participants consist of all conference participants except a particular conference participant that embedded the enhanced media packets in a particular audio stream in which the enhanced media packets were received.

9. The apparatus of claim 6, wherein each selected one of the conference participants is operable to automatically display an enhanced media window in response to receiving the enhanced media packets.

10. The apparatus of claim 6, wherein the enhanced media packets comprise video packets.

11. A system supporting communications comprising:
    a conference bridge operable to establish a communications conference having a plurality of conference participants;
    a first conference participant having a first set of media capabilities; and
    a second conference participant operable to communicate a message identifying a second set of media capabilities associated with the second conference participant to the conference bridge;
    wherein the conference bridge is further operable to redirect the message to the plurality of conference participants; and
    wherein the first conference participant is further operable to determine whether the first set of media capabilities and the second set of media capabilities both include an enhanced media capability, and to communicate enhanced media packets to the second conference participant in response to determining that the first set of media capabilities and the second set of media capabilities both include the enhanced media capability.

12. The system of claim 11, wherein communicating the enhanced media packets to the second conference participant comprises tunneling the enhanced media packets in a conference audio stream to the second conference participant.

13. The system of claim 11, wherein communicating the enhanced media packets to the second conference participant comprises communicating the enhanced media packets in an enhanced media communication link to the second conference participant.

14. The system of claim 11, wherein the conference bridge is further operable to redirect the message to selected ones of the conference participants, the selected ones of the conference participants including the first conference participant.

15. The system of claim 11, wherein the second conference participant is further operable to automatically display an enhanced media window in response to receiving the enhanced media packets.

16. The system of claim 11, wherein the enhanced media capability is a video capability and the enhanced media packets comprise video packets.

17. A system supporting communications comprising:
    a packet-based telephony device having a first set of media capabilities and operable to couple to a communications conference; and
    a computing device coupled to the telephony device and operable to receive a message from the communications conference identifying a second set of media capabilities associated with a remote device, to determine whether the first set of media capabilities and the second set of media capabilities both include an enhanced media capability, and to communicate enhanced media packets to the remote device in response to determining that the first set of media capabilities and the second set of media capabilities both include the enhanced media capability.

18. The system of claim 17, wherein communicating the enhanced media packets to the remote device comprises tunneling the enhanced media packets in a conference audio stream to the remote device.

19. The system of claim 17, wherein communicating the enhanced media packets to the remote device comprises communicating the enhanced media packets in an enhanced media communication link to the remote device.

20. The system of claim 17, wherein the conference bridge is further operable to redirect the message to selected ones of the conference participants, the selected ones of the conference participants including the first conference participant.

21. The system of claim 17, wherein the computing device is further operable to receive enhanced media packets from the remote device and to automatically display an enhanced media window in response to receiving the enhanced media packets from the remote device.

22. The system of claim 17, wherein the enhanced media capability is a video capability and the enhanced media packets comprise video packets.

23. A computer readable medium encoded with logic for supporting communications, the logic operable when executed to:
 establish a communications conference, the communications conference including a plurality of conference participants, each conference participant providing an audio stream;
 identify audio data packets in the audio streams;
 mix audio information from selected ones of the audio data packets to generate a conference audio stream;
 communicate the conference audio stream to the conference participants;
 identify enhanced media packets embedded in at least one of the audio streams; and
 communicate the enhanced media packets to selected ones of the conference participants;
 wherein communicating the enhanced media packets to selected ones of the conference participants comprises identifying conference participants capable of using the enhanced media packets and communicating the enhanced media packets to the identified conference participants.

24. The computer readable medium of claim 23, wherein communicating the enhanced media packets to selected ones of the conference participants comprises embedding the enhanced media packets in the conference audio stream.

25. The computer readable medium of claim 23, wherein the selected ones of the conference participants consist of all conference participants except a particular conference participant that embedded the enhanced media packets in a particular audio stream in which the enhanced media packets were received.

26. The computer readable medium of claim 23, wherein each selected one of the conference participants is operable to automatically display an enhanced media window in response to receiving the enhanced media packets.

27. The computer readable medium of claim 23, wherein the enhanced media packets comprise video packets.

28. A device for supporting communications comprising:
 means for establishing a communications conference, the communications conference including a plurality of conference participants, each conference participant providing an audio stream;
 means for identifying audio data packets in the audio streams;
 means for mixing audio information from selected ones of the audio data packets to generate a conference audio stream;
 means for communicating the conference audio stream to the conference participants;
 means for identifying enhanced media packets embedded in at least one of the audio streams; and
 means for communicating the enhanced media packets to selected ones of the conference participants;
 wherein the means for communicating the enhanced media packets to selected ones of the conference participants comprises means for identifying conference participants capable of using the enhanced media packets and means for communicating the enhanced media packets to the identified conference participants.

* * * * *

UNITED STATES PATENT AND TRADEMARK OFFICE
CERTIFICATE OF CORRECTION

PATENT NO. : 7,590,231 B2  
APPLICATION NO. : 10/810516  
DATED : September 15, 2009  
INVENTOR(S) : Tighe et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Twenty-first Day of September, 2010

David J. Kappos  
*Director of the United States Patent and Trademark Office*